June 13, 1933.    M. B. MORGAN    1,913,718
AUTOMOTIVE DRIVING AXLE
Filed June 15, 1932    2 Sheets-Sheet 1

INVENTOR:
M. B. Morgan
HIS ATTORNEYS

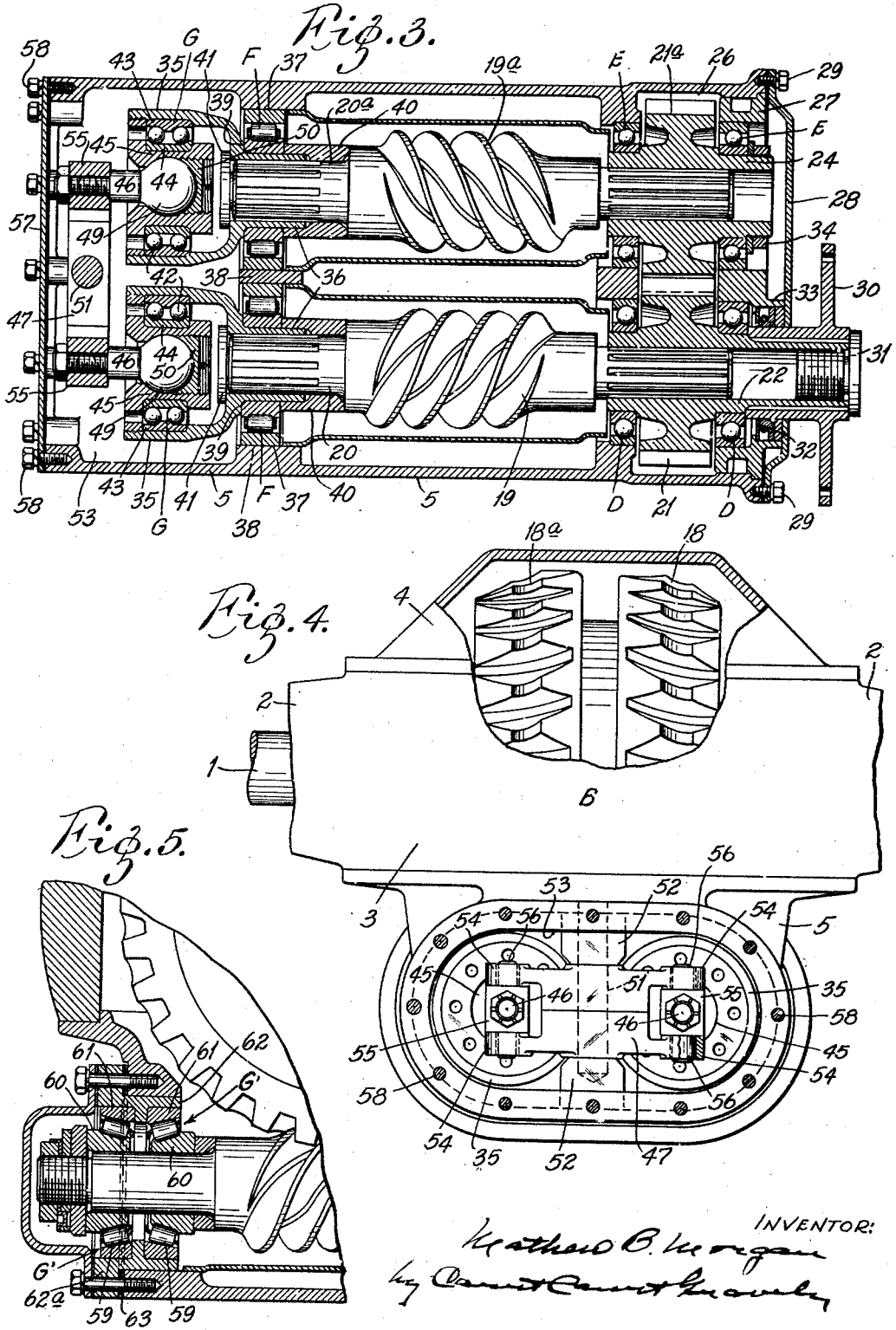

Patented June 13, 1933

1,913,718

UNITED STATES PATENT OFFICE

MATHEW B. MORGAN, OF DETROIT, MICHIGAN, ASSIGNOR TO THE TIMKEN-DETROIT AXLE COMPANY, OF DETROIT, MICHIGAN, A CORPORATION OF OHIO

AUTOMOTIVE DRIVING AXLE

Application filed June 15, 1932. Serial No. 617,270.

This invention relates principally to automotive driving axles of the kind wherein the power is transmitted from the engine to the axle through two sets of final drive gearing. The invention has for its principal objects to provide means whereby the power delivered to the axle is equally divided between the two sets of final drive gearing therefor, and to provide for simplicity and economy of construction and compactness of design. The invention consists in the automotive driving axle and in the construction, combinations and arrangements of parts hereinafter described and claimed.

Figure 1:
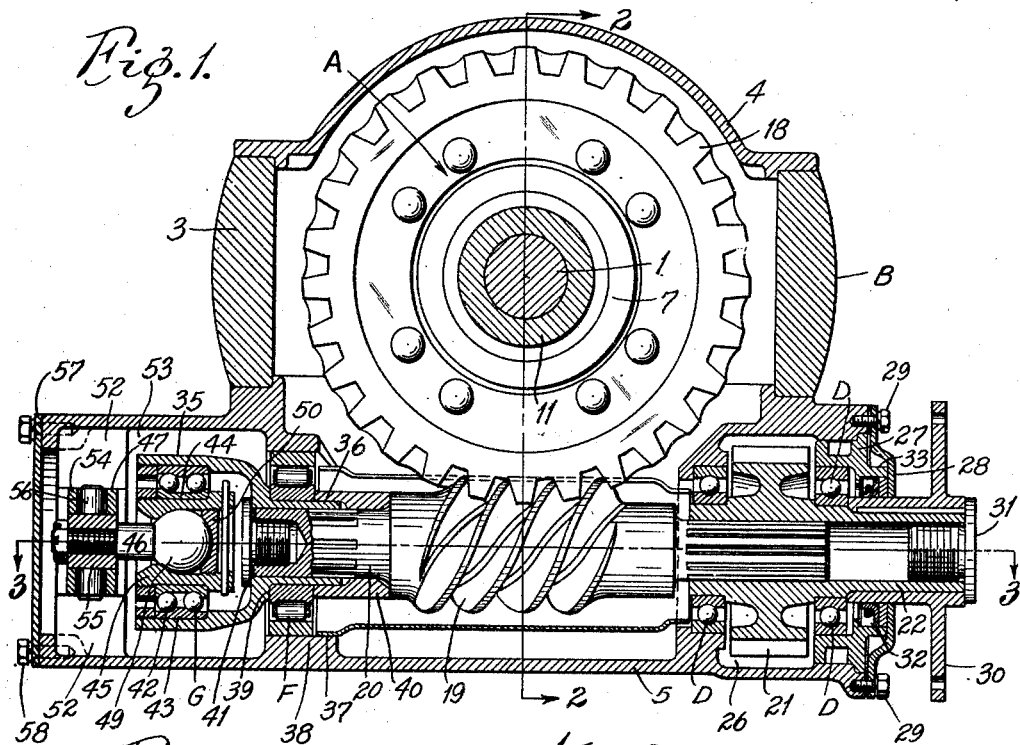
Figure 2:
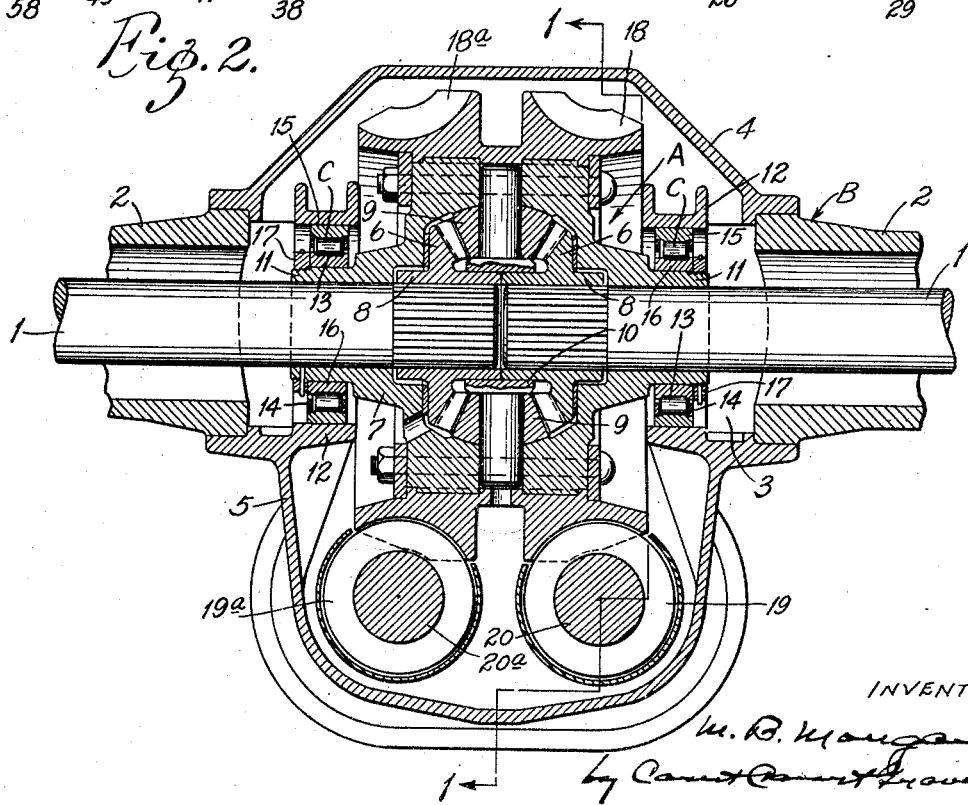

In the accompanying drawings, which form part of this specification and wherein like symbols refer to like parts wherever they occur, Fig. 1 is a vertical transverse section through the middle portion of an automotive driving axle embodying my invention, the section being taken on the line 1—1 in Fig. 2, Fig. 2 is a vertical central longitudinal section through the axle on the line 2—2 in Fig. 1, Fig. 3 is a horizontal section on the line 3—3 in Fig. 1, Fig. 4 is a rear elevation of the middle portion of the axle, with the rear cover plate removed and with a portion of the axle housing shown broken away to disclose the double worm gear; and Fig. 5 is a fragmentary vertical transverse section through the rear lower corner portion of a driving axle of modified construction.

Referring to the accompanying drawings, my invention is shown in connection with a worm drive differential axle construction comprising axially alined axle shaft sections 1 connected together at their inner ends by a suitable differential mechanism A all enclosed in a load supporting housing or casing B consisting of tubular end portions 2 connected by an enlarged middle portion 3 provided with a vertical opening whose upper end is closed by a closure plate 4 and whose lower end is closed by a member 5, which carries said differential mechanism that is removable with said member as a unit.

The differential mechanism A comprises two bevel side gears 6 that are mounted in a casing 7 with their hubs 8 splined on the inner ends of the respective axle shaft sections 1. Interposed between and intermeshing with the opposed bevel side gears 6 are bevel pinions 9 that are journaled on the radially extending studs of a spider 10 that is arranged to rotate with the differential gear casing 7. The differential gear casing 7 has axially alined hubs 11 projecting from its ends that are journaled in suitable antifriction bearings C mounted in split pedestals 12 provided therefor on the differential gear carrier 5. As shown in the drawings, each of the antifriction bearings C comprises a series of cylindrical rollers 13 that are assembled in a suitable cage 14 and are interposed between an outer raceway member 15, which is mounted in the opening in a pedestal 12 of the differential gear carrier 5, and an inner raceway member 16, which is mounted on the hub 11 at the adjacent end of the differential gear casing 7. The inner raceway member 16 is held on the hub 11 of the differential gear casing 7 by means of a nut 17, which is threaded on the outer end of said hub in abutting relation to the outer end of said inner raceway member.

The differential gear casing 7 is driven from the engine (not shown) of the vehicle by means of two sets of worm gearing provided with worms that are preferably underhung. The worm gears 18 and 18a of respective gear sets are preferably formed integral with a ring that is mounted on the differential gearing case 7 for rotation therewith. The gear 18 of the double worm gear on the differential gear case is intermeshed with and is driven by a left-handed worm 19 on a shaft 20 that is rotated clockwise; and the other worm gear 18a intermeshes with and is driven by a right-handed worm 19a on a horizontal shaft 20a that is rotated anti-clockwise. With overhung worm drives, the worm that is rotated clockwise has a right-handed thread, and the worm that is rotated anti-clockwise has a left-handed worm. The two worm shafts 20, 20a are journaled in the lower portion of the differential gear carrier 5 and extend parallel to each other in directions transverse to the axle axis. Slidably splined on the forward end of the worm shaft 20 is a spur gear 21, which intermeshes with a similar spur gear 21a slidably splined on the forward end of the other worm shaft 20a. The gear 21 on the forward end of the worm shaft is provided with an elongated hub 22 that is supported in suitable antifriction bearings, preferably roller thrust bearings D, located in the differential gear carrier 5 at opposite ends of said gear; and likewise, the gear 21a on the worm shaft 20a is provided with an elongated hub 24 that is supported in similarly disposed roller thrust bearings E. The forward end of the lower worm shaft supporting portion of the differential gear carrier 5 is provided with an enlarged opening 26 adapted to removably receive the spur gears 21 and 21a and their respective supporting bearings D and E. A supporting member or block 27 is seated in the forward end of the opening 26 in the gear carrier 5 and has two horizontally spaced openings therein adapted to receive and support the forward bearings of the respective pairs of gear supporting bearings D and E. The opening 26 in the forward end of the lower end of the gear carrier 5 is covered by means of a closure member 28, which is removably secured in place by cap screws 29 and serves to hold said bearing supporting member 27 in place in said opening. The hub 22 of the gear 21 on the worm shaft 20 extends forwardly through an opening provided therefore in the closure plate 28 and has a driving disk 30 splined thereto and held therein by means of a headed plug 31 threaded in the bore of said hub. Leakage of oil through the hub receiving opening in the closure plate 28 is prevented by means of an annular oil seal 32 interposed between the hub of the gear 21 and an annular flange 33 on the outer face of the bearing supporting member 27. The supporting bearings E for the gear 21a are adjustably held in place by means of a ring nut 34, which is threaded on the forward end of the hub of said gear in abutting relation to the inner raceway member of the forward bearing.

Located at the rear end of each of the worm shafts 20 and 20a is a cage or housing member 35 whose forward end is provided with a hub 36, which is splined on the rear end of the worm shaft. The hub 36 of each cage or housing 35 is rotatably supported in the lower worm shaft receiving portion of the differential gear carrier 5 by means of an antifriction bearing, preferably a cylindrical roller bearing F, mounted in an opening 37 which is formed in a vertical web or wall 38 in the carrier and through which the worm shaft is inserted in and withdrawn from said carrier. The cylindrical roller bearing F is held in place by means of a shoulder 39 formed by the bell-shaped cage or housing 35 and a sleeve 40 sleeved on the worm shaft between said bearing and the rear end of a worm on said shaft. The hub 36 of the cage 35 is held on the worm shaft by means of a headed screw 41, which is threaded into the rear end of said shaft with its head in abutting relation to the hub end of said cage.

Mounted in the bell-shaped portion of each cage or housing 35 is an antifriction bearing, preferably a double ball thrust bearing G, comprising two series of balls 42 interposed between an outer raceway member 43 seated in said bell-shaped portion and an inner raceway member 44 seated on a sleeve 45 that has a universal joint or ball-and-socket connection with the forward end of a horizontal stud 46, whose rear end is rigidly secured to the adjacent end of an equalizing lever 47. The ball-and-socket connection between the sleeve 45 in the bell-shaped member 35 fixed to the rear end of each of the worm shafts 20 and 20a comprises a ball 49 on the forward end of the stud 46, which ball engages a spherical surface provided therefor in the bore of said sleeve and is held in place therein by means of a plug 50 that is threaded in the forward end of the bore and has a spherical surface adapted to engage the forward end portion of the ball. The equalizing lever 47 is mounted for horizontal swinging movement on a vertical pivot 51 located midway between the axes of the two worm shafts 20 and 20a. The equalizing lever 47 is disposed between bosses 52 in the top and bottom of an elongated opening 53 formed in the rear end portion of the casing 5, which bosses serve to support and retain the respective ends of the pivot pin 51. The equalizing lever 47 is preferably split along the horizontal plane of the axes of the two worm shafts 20 and 20a and has its ends shaped to form yokes 54 whose branches straddle blocks 55, which are threaded to receive the ends of the studs 46 and are provided with vertical trunnions 56 that are rotatable within openings provided therefor in the branches of said yokes. The rear end of the lower portion of the carrier is closed by means of a closure plate 57 that is removably held in place by a cap screw 58; and the opening closed by said plate is made large enough to permit the two worm shafts and all of the parts associated with the rear end portions thereof to be mounted in and withdrawn from said carrier through said opening.

The hereinbefore described arrangement divides between two sets of gears the work that has heretofore been done with a single set of gears, thereby making it feasible to reduce the size of the two gear sets below what would be feasible with a single gear set of equal capacity. With this arrangement, great power may be transmitted to the axle without increasing the diameter of the gears and thus cutting down the body or road clearance. The hereinbefore described arrangement also forces each set of gears to transmit substantially the same amount of power to the differential gear case by utilizing the end thrust reactions on the worms to secure an equal division of the power therebetween. This is accomplished by means of the equalizing lever 47 that connects together the rear ends of the two worm shafts. With this arrangement, the end thrust reactions on the two worms 19, 19a tend to move both worms axially in the same direction, such axial sliding movement of the two worm shafts being permitted by means of the splined connections between said worm shafts and the spur gears 21, 21a. This tendency of the worm shafts to shift longitudinally due to the end thrust reactions and thus take more than their share of the load is overcome by means of the equalizing lever connection between the rear ends of the two worm shafts, which connection operates to cause the end thrust reaction on one worm shaft to resist or balance that on the other worm shaft. In other words, the lever connection between the ends of the two worm shafts causes the end thrust imposed on one shaft to directly oppose and neutralize the end thrust on the other worm shaft, thereby holding the shafts in proper position to cause them to transmit equal power to the differential gear case. It is noted that the thread or helix angle of the two worm gears 18, 18a is such that the end thrust thereon tends to force the two gears towards each other and thus eliminates the necessity for using thrust bearings for preventing endwise movement of the differential gear casing.

In the modification shown in Fig. 5, the equalizing lever is eliminated and a shim adjusted thrust bearing is employed to obtain an equal distribution of the power between the two sets of worm gearing. In this construction, the rear end of each worm shaft is supported in two combined radial and thrust bearings G', each of which comprises a series of taper roller bearings 59 interposed between a cone or inner raceway 60 mounted on the worm shaft and a cup or outer raceway 61 mounted in a sleeve 62 supported in an opening provided therefor in the rear wall of the differential gear carrier. The bearings G' are adjusted to properly position the worm with reference to the worm gear by means of shims 63 interposed between the end wall of the differential gear carrier and a flange 62a on the bearing supporting sleeve 62. With this arrangement, one worm wheel will take slightly more load until the wear on the worm teeth is sufficient to allow the other worm wheel to take its share of the load.

Obviously, the hereinbefore described construction admits of considerable modification without departing from the invention. Therefore, I do not wish to be limited to the precise arrangement shown and described.

What I claim is:

1. A power transmission mechanism comprising two parallel relatively axially movable shafts, intermeshing gears having driving connections with the respective shafts, said connections permitting relative axial sliding movement of said shafts and said gears, each of said shafts being provided with a worm, one of said gears being adapted to be driven from a suitable source of power, worm gears intermeshing with and driven by the worms of the respective shafts and adapted to rotate together about a common axis, and means for operatively connecting said shafts, whereby the end thrust reaction on one shaft opposes the end thrust reaction on the other shaft, the helix angle of the teeth of said worm gears being such that end thrust thereon is in the direction of each other.

2. A power transmission mechanism comprising two parallel shafts each provided with a worm, means for driving said shafts, worm gears intermeshing with and driven by the worms of the respective shafts and adapted to rotate together about a common axis, and means for operatively connecting said shafts, whereby the end thrust reaction on one shaft serves to oppose that on the other shaft, said means comprising a lever arranged for swinging movement in a plane parallel to a plane passing through the axes of said shafts with its arms operatively connected to the respective shafts and connections between the ends of said lever and the respective shafts, each connection including two members one connected to said lever and the other to one of said shafts, one of said members being located within the other member, and an antifriction bearing interposed between the two members.

3. A power transmission mechanism comprising two parallel axially movable shafts provided respectively with a right-handed worm and a left-handed worm, intermeshing gears having driving connections with the respective shafts for rotating them, said driving connections permitting relative axial sliding movement of said shafts and said gears, one of said gears being adapted to be driven from a suitable source of power, worm gears intermeshing with and driven by the worms of the respective shafts and adapted to rotate together about a common axis, and means for operatively connecting said shafts, whereby the end thrust reaction on one shaft serves to oppose the end thrust reaction on the other of said shafts, said means comprising an equalizing lever arranged for swinging movement in a plane parallel to a plane passing through the axes of said shafts and connections between the ends of said lever and the respective shafts, each connection including two members one connected to said lever and the other to one of said shafts, one of said members being located within the other member, and an antifriction bearing interposed between the two members.

4. A power transmission mechanism comprising parallel axially movable shafts, intermeshing gears having driving connections with said shafts, worms on the respective shafts, worm gears intermeshing with and driven by the respective worms and arranged to rotate together about a common axis, an equalizing lever located at one end of said shafts for swinging movement in a plane disposed parallel to a plane passing through the axes of said worms, and means for operatively connecting the arms of said lever with the adjacent ends of the respective shafts, the driving connections between said intermeshing gears and said shafts permitting axial sliding movement of said shafts relative to said gears.

5. A power transmission mechanism comprising a housing, two parallel shafts mounted in said housing for rotary and independent axial sliding movement, means for driving one of said shafts, a gear on one of said shafts, a gear on the other of said shafts intermeshing with and driven by said first mentioned gear, said shafts being provided with worms of opposite hand, worm gears intermeshing with and driven by the worms on the respective shafts, said worm gears being mounted in said housing to rotate together about a common axis, housing members removably secured to the corresponding ends of the respective shafts, an equalizing lever pivotally supported in said housing for swinging movement in a plane parallel to a plane passing through the axes of said shafts, sleeves journaled in the respective housings, antifriction bearings interposed between said housings and said sleeves, and studs fixed to the ends of said equalizing lever and having universal joint connections with the sleeves in the respective housings.

6. An automotive driving axle construction comprising an axle housing, a differential gear case journaled in said housing, two worm gears rotatable with said case, two parallel shafts mounted in said housing for rotary and independent axial sliding movement, gears journaled in said housing and having driving connections with the respective shafts that permit said shafts to move axially of said gears, said shafts being provided with worms intermeshing respectively with the worm gears on said differential gear case, the end thrust reaction on one shaft being in the same direction as that on the other shaft, and means for operatively connecting said shafts, whereby the end thrust reaction on one shaft serves to oppose the end thrust reaction on the other shaft.

7. An automotive driving axle construction comprising an axle housing, a differential gear case journaled in said housing, two worm gears rotatable with said case, two parallel shafts mounted in said housing for rotary and independent axial sliding movement, gears journaled in said axle housing for driving the respective shafts, driving connections between said gears and said shafts permitting said shafts to be inserted in and removed from said housing without disturbing said gears, said shafts being geared together and provided with worms intermeshing respectively with the worm gears on said differential gear case, the end thrust reaction on one shaft being in the same direction as that on the other shaft, means for operatively connecting said shafts, whereby the end thrust reaction on one shaft serves to oppose the end thrust reaction on the other shaft, said means comprising an equalizing lever mounted in said housing for swinging movement in a plane parallel to a plane passing through the axes of said shafts and having universal joint connections between its arms and adjacent ends of the respective shafts.

8. An automotive driving axle construction comprising a housing, a differential gear casing journaled in said housing, two worm gears mounted on said differential gear casing for rotation therewith, two parallel shafts extending transversely of the worm gear axis, said shafts being provided with worms of opposite hand intermeshing with the respective worm gears, means for driving one of said shafts, a gear on said last mentioned shaft, a gear on the other shaft intermeshing with and driven by said first mentioned gear, and means operatively connecting said shafts, whereby the end thrust reaction on one shaft opposes the end thrust on the other shaft and connections between the ends of said lever and the respective shafts, each connection including two members one connected to said lever and the other to one of said shafts, one of said members being located within the other member, and an antifriction bearing interposed between the two members.

9. An automotive driving axle construction comprising a housing, two spaced parallel shafts rotatably mounted in said housing for independent axial sliding movement therein, means for driving one of said shafts, a spur gear on one of said shafts, a spur gear on the other of said shafts intermeshing with and driven by said first mentioned spur gear, said shafts being provided with worms of opposite hand, worm gears intermeshing with and driven by the worms on the respective shafts, said worm gears being mounted in said housing to rotate together about a common axis, housing members removably secured to the respective shafts adjacent to one end thereof, an equalizing lever pivotally supported in said housing for swinging movement in a plane parallel to a plane passing through the axes of said shafts, sleeves mounted in the housings on the respective shafts, antifriction bearings interposed between said housings and the sleeves therein, and studs pivoted to the ends of said equalizing lever and having universal joint connections with the respective housings.

10. An automotive driving axle construction comprising a housing, two spaced parallel shafts rotatably mounted in said housing for independent axial sliding movement therein, spur gears journaled in said housing and having splined hub portions adapted to receive correspondingly splined end portions of the respective shafts, said shafts being provided with worms of opposite hand, worm gears intermeshing with and driven by the worms on the respective shafts, said worm gears being mounted in said housing to rotate together about a common axis, housing members removably secured to the respective shafts adjacent to one end thereof, an equalizing lever pivotally supported in said housing for swinging movement in a plane parallel to a plane passing through the axes of said shafts, sleeves journaled in the housings on the respective shafts, and studs fixed to the ends of said equalizing lever and having universal joint connections with the respective housings, said spur gears being adapted to be inserted in and removed from said housing through an opening therein, and said shafts, said equalizing lever and the connections between said lever and said shafts being all adapted to be inserted in and removed from said housing through another opening therein.

11. An automotive driving axle construction comprising an axle housing, a carrier member removably secured to said housing, two spaced parallel shafts rotatably mounted in said carrier for independent axial sliding movement therein, means for driving one of said shafts including a spur gear journaled in said carrier and splined to said shaft, a spur gear journaled in said carrier and splined to the other of said shafts and intermeshing with and driven by said first mentioned spur gear, said shafts being each provided with a worm, worm gears intermeshing with and driven by the worms on the respective shafts, said worm gears being mounted in said carrier to rotate together about a common axis, the end thrust reaction on one shaft being in the same direction as that on the other shaft and the end thrust on each worm gear being in the direction of the other worm gear, housing members removably secured to the respective shafts adjacent to one end thereof, an equalizing lever pivotally supported in said carrier for swinging movement in a plane parallel to a plane passing through the axes of said shafts, sleeves mounted in the respective housings, antifriction bearings interposed between said housings and the sleeves therein, and studs pivoted on the ends of said equalizing lever and having universal joint connections with the respective housings.

Signed at Detroit, Michigan, this 6th day of June, 1932.

MATHEW B. MORGAN.